US012029331B2

(12) United States Patent
Kaemingk et al.

(10) Patent No.: US 12,029,331 B2
(45) Date of Patent: Jul. 9, 2024

(54) SYSTEMS AND METHODS FOR DISPLAY CASE DIAGNOSTICS

(71) Applicant: Hill Phoenix, Inc., Conyers, GA (US)

(72) Inventors: Nate Kaemingk, Tyrone, GA (US); Chetan Gundurao, Bengaluru (IN)

(73) Assignee: Hill Phoenix, Inc., Conyers, GA (US)

( * ) Notice: Subject to any disclaimer, the term of this patent is extended or adjusted under 35 U.S.C. 154(b) by 465 days.

(21) Appl. No.: 16/883,092

(22) Filed: May 26, 2020

(65) Prior Publication Data
US 2021/0369008 A1 Dec. 2, 2021

(51) Int. Cl.
*A47F 3/04* (2006.01)
*G06F 9/54* (2006.01)
*G06F 16/901* (2019.01)
*G06F 16/9035* (2019.01)

(52) U.S. Cl.
CPC ............ *A47F 3/0426* (2013.01); *G06F 9/542* (2013.01); *G06F 16/9027* (2019.01); *G06F 16/9035* (2019.01)

(58) Field of Classification Search
CPC ...... A47F 3/0426; A47F 3/0478; G06F 9/542; G06F 16/9027; G06F 16/9035
USPC .................................. 707/705, 736, 741, 749
See application file for complete search history.

(56) References Cited

U.S. PATENT DOCUMENTS

| 11,057,276 B2* | 7/2021 | Biran ...................... H04L 41/22 |
| 2007/0247831 A1* | 10/2007 | Buelow, II .............. F25D 27/00 362/92 |
| 2008/0320458 A1* | 12/2008 | Aronson ............. G06F 11/3636 717/154 |
| 2011/0106339 A1* | 5/2011 | Phillips ................. G05D 1/0274 701/2 |
| 2014/0250138 A1* | 9/2014 | Friling ................ H04L 41/0604 707/754 |
| 2015/0285551 A1* | 10/2015 | Aiken ................... A47F 3/0478 62/155 |
| 2016/0249748 A1* | 9/2016 | Winters ................. G08B 21/02 340/4.34 |
| 2019/0104024 A1* | 4/2019 | Biran .................. H04L 41/0677 |
| 2019/0167014 A1* | 6/2019 | Seiss ..................... A47F 3/0478 |
| 2020/0008331 A1* | 1/2020 | Inagaki .............. H05K 13/0815 |

* cited by examiner

Primary Examiner — Phong H Nguyen
(74) Attorney, Agent, or Firm — Fish & Richardson P.C.

(57) ABSTRACT

A diagnostics system for a display case includes a display case, a display device, and a remote controller, according to some embodiments. The display case includes a local controller, a refrigeration apparatus, and multiple sensors. The remote controller includes a processing circuit configured to receive diagnostics data from the local controller of the display case, according to some embodiments. The processing circuit is configured to identify one or more events using the diagnostics data and assign a rank to each of the one or more events. The processing circuit is configured to promote the rank of each of the one or more events based on an amount of time that each of the one or more events persists. The processing circuit is configured to operate the display device to notify a user regarding the one or more events and the rank of each event.

22 Claims, 15 Drawing Sheets

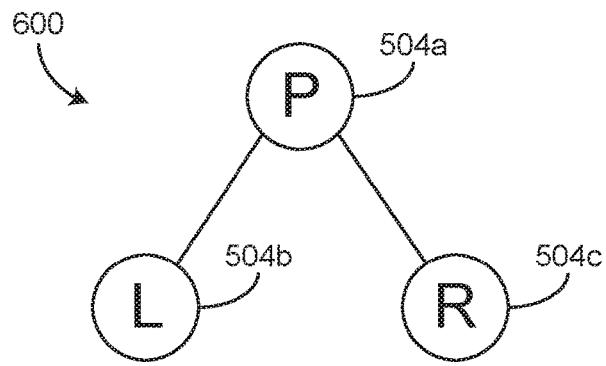
FIG. 6
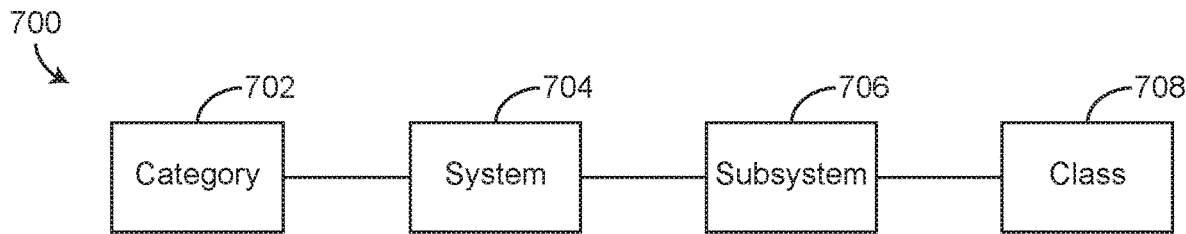
FIG. 7
| Category | HEX |
|---|---|
| Electronic Controls | 1 |
| Refrigeration | 2 |
| Communication Networks | 3 |
| Field Inputs | 4 |
| Rack Inputs | 5 |
| Field Outputs | 6 |
| Rack Outputs | 7 |
| Superheat Control | 8 |
| Pressure Regulators | 9 |
| Downstream | A |
| Upstream | B |
FIG. 8

| System | HEX |
|---|---|
| ECM Fans 01 | 23 |
| ECM Fans 02 | 24 |
| ECM Fans 03 | 25 |
| ECM Fans 04 | 26 |
| ECM Fans 05 | 27 |
| ECM Fans 06 | 28 |
| Analog Inputs | 29 |
| Analog Outputs | 2A |
| Digital Inputs | 2B |
| Digital Outputs | 2C |
| General Rack | 2D |
| General Comp. | 2E |
| General OMB | 2F |
| General Fan | 30 |
| General VFD | 31 |
| General EVD | 32 |
| Power Meter | 33 |
| General Relay/Contact | 34 |
| Electric Subassy. | 35 |
| EBM Comms Module | 36 |
| Coresense 07 | 37 |
| Coresense 08 | 38 |
| Coresense 09 | 39 |
| Coresense 10 | 3A |
| Coresense 11 | 3B |
| Coresense 12 | 3C |
| BACNet | 3D |
| Subcooler | 3E |
| ECBlue Comms | 3F |

FIG. 11B

SYSTEMS AND METHODS FOR DISPLAY CASE DIAGNOSTICS

BACKGROUND

The present disclosure relates to display cases. More particularly, the present disclosure relates to diagnostic systems for display cases.

SUMMARY

One implementation of the present disclosure is a diagnostics system for a display case. The diagnostics system includes a display case, a display device, and a remote controller, according to some embodiments. In some embodiments, the display case includes a local controller, a refrigeration apparatus, and multiple sensors. In some embodiments, the remote controller includes a processing circuit. The processing circuit is configured to receive diagnostics data from the local controller of the display case, according to some embodiments. In some embodiments, the processing circuit is configured to identify one or more events using the diagnostics data. In some embodiments, the processing circuit is configured to assign a rank to each of the one or more events. In some embodiments, the processing circuit is configured to promote the rank of each of the one or more events based on an amount of time that each of the one or more events persists. In some embodiments, the processing circuit is configured to operate the display device to notify a user regarding the one or more events and the rank of each event.

In some embodiments, the processing circuit is configured to, for each of the events compare the amount of time that the event has persisted to a threshold amount of time. In some embodiments, the processing circuit is configured to, for each of the events, promote the rank of the event to a higher rank in response to the amount of time being equal to or greater than the threshold amount of time. In some embodiments, the processing circuit is configured to, for each of the events, maintain the rank of the event in response to the amount of time being less than the threshold amount of time.

In some embodiments, the processing circuit is configured to assign any of an information rank, a warning rank, an error rank, or a critical rank to each of the one or more events.

In some embodiments, the diagnostics system further includes an alert system. In some embodiments, the processing circuit is configured to operate the alert system to provide at least one of a visual or an aural alert to the user for any of the alarms assigned the critical rank.

In some embodiments, the diagnostics data includes a troubleshooting code associated with each event. In some embodiments, the troubleshooting code includes at least a category of the event, a system of the event, a subsystem of the event, and a class of the event.

In some embodiments, the processing circuit is configured to sort and display multiple troubleshooting codes based on the category, the system, the subsystem, or the class of the troubleshooting codes.

In some embodiments, the processing circuit is configured to map each of the troubleshooting codes to a troubleshooting strategy using a classification tree, the category, the system, the subsystem, and the class. In some embodiments, the processing circuit is configured to operate the display device to provide the troubleshooting strategy to the user.

In some embodiments, the processing circuit is configured to notify an owner regarding one or more events assigned a critical rank by sending an email to the owner, sending a text message to the owner, providing a notification to a mobile device, or operating the display device.

Another implementation of the present disclosure is a controller for a diagnostics system of a display case. In some embodiments, the controller includes a processing circuit. In some embodiments, the processing circuit is configured to receive diagnostics data from a local controller of the display case. In some embodiments, the processing circuit is configured to identify one or more events using the diagnostics data. In some embodiments, the processing circuit is configured to assign a rank to each of the one or more events. In some embodiments, the processing circuit is configured to promote the rank of each of the one or more events based on an amount of time that each of the one or more events persists. In some embodiments, the processing circuit is configured to operate the display device to notify a user regarding the one or more events and the rank of each event.

In some embodiments, the processing circuit is configured to, for each of the events, compare the amount of time that the event has persisted to a threshold amount of time. In some embodiments, the processing circuit is further configured to, for each of the events, promote the rank of the event to a higher rank in response to the amount of time being equal to or greater than the threshold amount of time. In some embodiments, the processing circuit is configured to, for each of the events, maintain the rank of the event in response to the amount of time being less than the threshold amount of time.

In some embodiments, the processing circuit is configured to assign any of an information rank, a warning rank, an error rank, or a critical rank to each of the one or more events.

In some embodiments, the processing circuit is configured to operate an alert system to provide at least one of a visual or an aural alert to the user for any of the events assigned the critical rank.

In some embodiments, the diagnostics data includes a troubleshooting code associated with each event. In some embodiments, the troubleshooting code includes at least a category of the event, a system of the event, a subsystem of the event, and a class of the event.

In some embodiments, the processing circuit is configured to sort and display multiple troubleshooting codes based on the category, the system, the subsystem, or the class of the troubleshooting codes.

In some embodiments, the processing circuit is configured to map each of the troubleshooting codes to a troubleshooting strategy using a classification tree, the category, the system, the subsystem, and the class. In some embodiments, the processing circuit is configured to operate the display device to provide the troubleshooting strategy to the user.

Another implementation of the present disclosure is a method for a diagnostics of a display case. In some embodiments, the method includes receiving diagnostics data from a display case. In some embodiments, the method includes identifying one or more events using the diagnostics data. In some embodiments, the method includes assigning a rank to each of the one or more events. In some embodiments, the method includes promoting the rank of each of the one or more events based on an amount of time that each of the one or more events persists. In some embodiments, the method includes operating a display device to notify a user regarding the one or more events and the rank of each event.

In some embodiments, the method includes, for each of the events, comparing the amount of time that the event has persisted to a threshold amount of time. In some embodiments, the method includes, for each of the events, promoting the rank of the event to a higher rank in response to the amount of time being equal to or greater than the threshold amount of time. In some embodiments, the method includes, for each of the events, maintaining the rank of the event in response to the amount of time being less than the threshold amount of time.

In some embodiments, the method further includes assigning any of an information rank, a warning rank, an error rank, or a critical rank to each of the one or more events.

In some embodiments, the method further includes operating an alert system to provide at least one of a visual or an aural alert to the user for any of the alarms assigned the critical rank.

In some embodiments, the diagnostics data includes a troubleshooting code associated with each event. In some embodiments, the troubleshooting code includes at least a category of the event, a system of the event, a subsystem of the event, and a class of the event. In some embodiments, the method further includes sorting and displaying multiple troubleshooting codes based on the category, the system, the subsystem, or the class of the troubleshooting codes. In some embodiments, the method includes mapping each of the troubleshooting codes to a troubleshooting strategy using a classification tree, the category, the system, the subsystem, and the class. In some embodiments, the method includes operating the display device to provide the troubleshooting strategy to the user.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 6 is a diagram of a node of an alarm/event classification tree, according to some embodiments.

FIG. 7 is a block diagram of a 4-byte diagnostic troubleshooting code including a category, a system, a subsystem, and a class, according to some embodiments.

FIG. 8 is a table of various values of the category of the troubleshooting code of FIG. 7, according to some embodiments.

FIGS. 11A-11B are a table of various values of the system of the troubleshooting code of FIG. 7, according to some embodiments.

DETAILED DESCRIPTION

Overview

Referring generally to the FIGURES, a diagnostics system for a display case can include a remote controller that is communicably coupled (e.g., wirelessly) with one or more local controllers of one or more display cases or a rack of display cases. The remote controller can obtain diagnostics data that indicates one or more faults, events, alarms, alerts, failures, etc., of the display case, systems of the display case, subsystems, sensors, apparatuses, etc. The remote controller can be configured to identify a category, a system, a subsystem and a class of the each event of the diagnostic data. The remote controller can also identify a rack unit that the diagnostics data is received from. The remote controller may generate or receive a diagnostics code that includes the category, system, subsystem, and class of the events of the diagnostic data.

The remote controller can assign a rank to each event that is identified in the diagnostic data. The rank may be any of an information rank, a warning rank, an alarm rank, and a critical rank. Each rank is associated with different actions. For example, the diagnostics system can include a display device and/or an alert system. The remote controller can be configured to operate the display device and/or the alert system based on the rank of each event. For example, the remote controller may provide an email to an owner of the display case and/or operate the alert system to notify an owner, technician, user, etc., of the display case regarding any events that are assigned the critical rank. The remote controller can also be configured to monitor an amount of time that each event/alarm persists. If the alarm/event persists for at least a threshold amount, the remote controller may increase, promote, or elevate the rank.

Advantageously, the diagnostics system can facilitate improved troubleshooting for a technician. For example, the technician may be presented with only events/alarms that have a critical rank. Advantageously, the diagnostics system can reduce an amount of time that a technician spends determining which alerts/alarms require attention by providing or presenting events/alarms that have a critical rank.

Temperature Controlled Display Case

Figure 1:
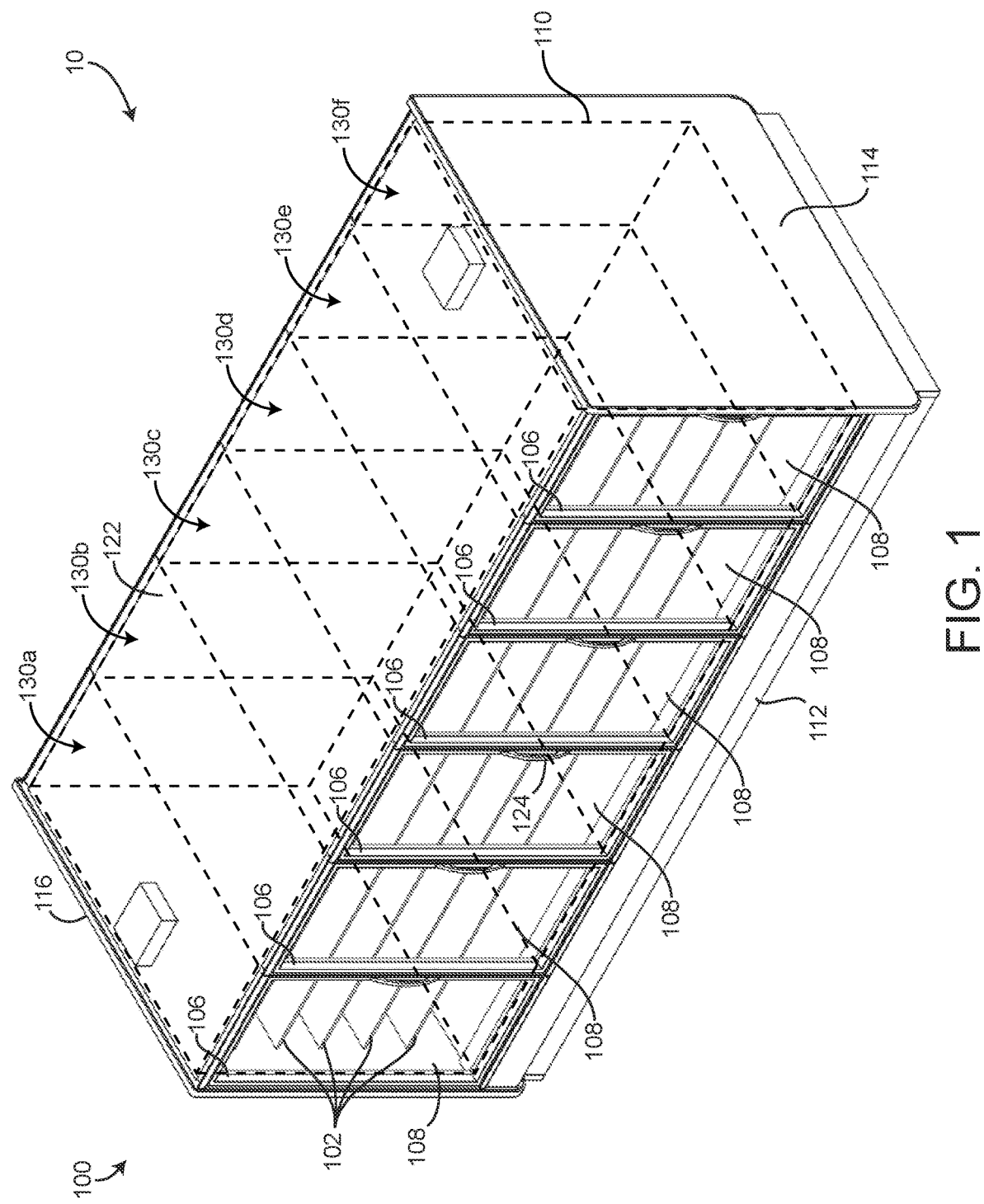
FIG. 1 is a perspective view of a temperature-controlled case, according to some embodiments.
Figure 2:
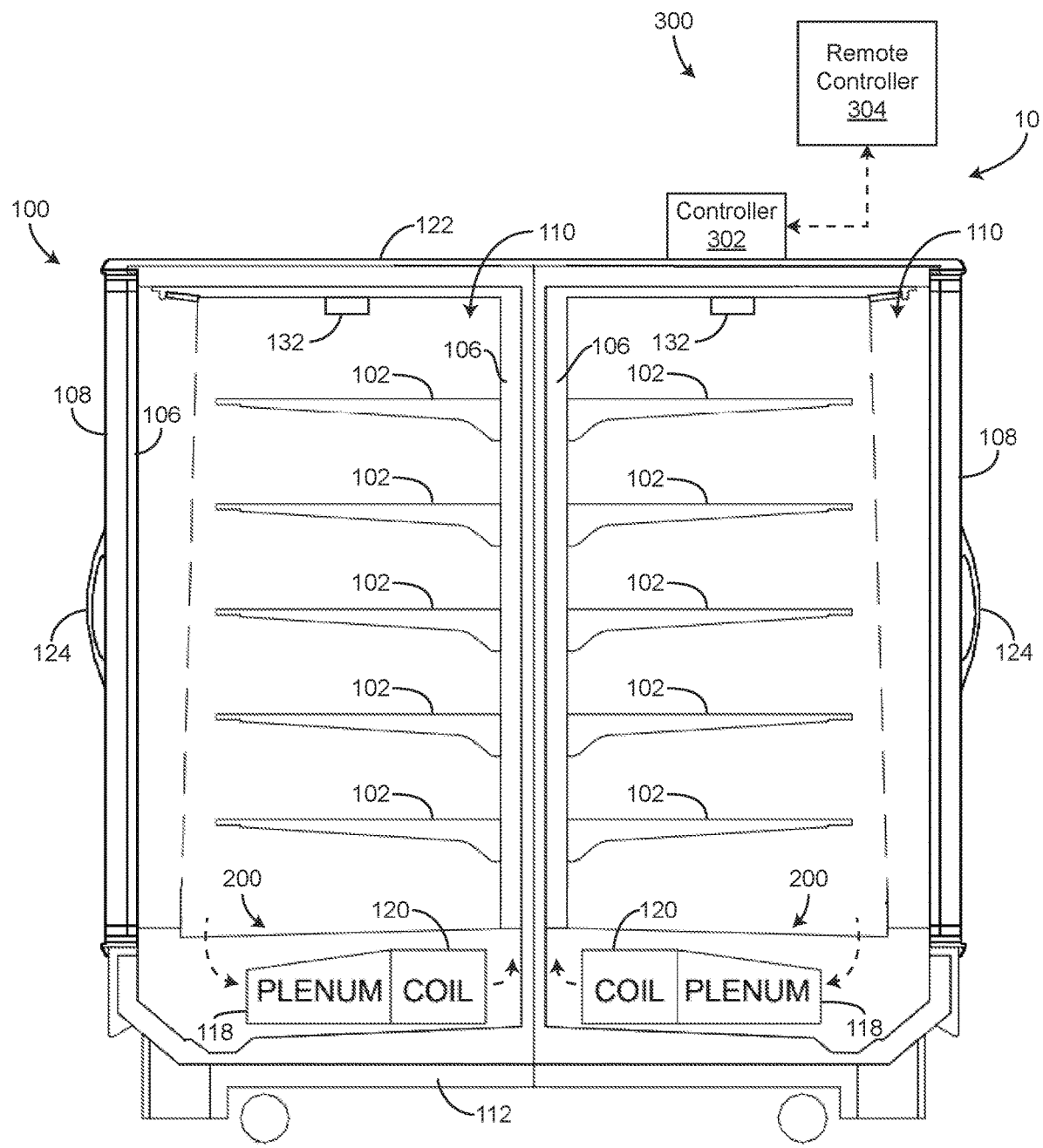
FIG. 2 is side view of the temperature-controlled case, according to some embodiments.

Referring to FIGS. 1-2, a display case system 10 includes a refrigerated display case, a display case, a temperature controlled case, etc., shown as display case 100 is shown, according to some embodiments. Display case system 10 can also include a controller 302. In some embodiments, controller 302 is a component of display case 100. Display case 100 includes a base, a frame, a carriage, a main structure, a floor, etc., shown as base 112. Display case 100 also includes multiple sidewalls, walls, planar structures, planar members, support members, etc., shown as sidewall 116 and sidewall 114. Sidewall 114 and sidewall 116 may be positioned a distance apart from each other along a longitudinal axis of display case 100.

Display case 100 also includes a top wall, a top surface, a ceiling, etc., shown as upper wall 122. Upper wall 122 may be fixedly coupled with sidewall 114 and sidewall 116. Upper wall 122, sidewall 114 and sidewall 116 may be sealingly coupled with each other to facilitate preventing the escape of air from within display case 100.

Display case 100 also includes multiple doors, windows, access points, openings, etc., shown as doors 108. Display case 100 can include a first set of doors 108 along a first side of display case 100 and a second set of doors 108 along a second or opposite side of display case 100. Doors 108 can be hingedly coupled between upper wall 122 and base 112, or may be slidable (e.g., configured to translate along a track to facilitate access to an interior of display case 100). Doors 108 may facilitate access of an interior volume or conditioned space within display case 100 (e.g., inner volume 110 as described herein). In other embodiments, display case 100 only includes a first set of doors 108 along one side of display case 100, and an opposite side of display case 100 is a wall member (e.g., similar to sidewall 114 and/or sidewall 116).

Sidewall 114, sidewall 116, base 112, and upper wall 122 cooperatively define an inner volume 110. Inner volume 110 can be an interior volume of display case 100 that is temperature controlled (e.g., cooled) by a cooling apparatus or a cooling system, shown as refrigeration apparatus 200 of display case 100. Refrigeration apparatus 200 includes a plenum 118 and a coil 120 that are configured to operate to draw air from inner volume 110, cool the air, and discharge or output cooled air to inner volume 110. Coil 120 may be or include a heat exchanger that is configured to circulate a coolant and pass air over the heat exchanger to decrease a temperature of the air (e.g., to cool the air). The cool air is then discharged to inner volume 110 to maintain a desired temperature within inner volume 110.

Referring still to FIGS. 1-2, display case 100 can include a controller 302 and a temperature sensor 132. Controller 302 is configured to generate control signals for refrigeration apparatus 200 so that refrigeration apparatus 200 operates to achieve a desired amount of cooling or a desired temperature within display case 100. Controller 302 can receive values of a current temperature within display case 100 from temperature sensor 132. In this way, controller 302 may operate refrigeration apparatus 200 using a closed-loop control scheme, with sensor data obtained from temperature sensor 132 functioning as feedback.

Referring particularly to FIG. 2, display case 100 can include multiple shelves 102. Shelves 102 may extend from a rear wall, or a central member 106 of display case 100. Shelves 102 can be configured to support a product (e.g., containers, dairy products, food items, etc.) so that when a customer accesses inner volume 110 of display case 100, the customer may also access the product on shelves 102. In some embodiments, shelves 102 are spaced apart along a vertical direction. Shelves 102 may also fixedly couple or be supported by sidewall 114 and/or sidewall 116.

Referring again to FIG. 1, display case 100 can be modular, including multiple sections or multiple refrigerated display cases 100 that are positioned along base 112. Inner volume 110 can include multiple sub-volumes 130a-130f (e.g., six) that each include shelves 102 configured to store product. Sub-volumes 130a-130f can each include a corresponding door 108 and/or a corresponding refrigeration apparatus 200. In this way, a temperature or cooling of each sub-volume 130a-130f can be independently controlled by controller 302 through operation of refrigeration apparatuses 200.

Diagnostic System

Referring particularly to FIG. 2, display case 100 can include a diagnostics system 600, including controller 302. In some embodiments, controller 302 is a component of a control system of display case 100 that is configured to locally perform a control scheme, a control technique, etc., to operate various controllable elements, systems, apparatuses, sub-systems, components, etc., of display case 100. Diagnostics system 600 can include a remote controller 304 that is configured to communicate (e.g., wirelessly) with controller 302. In some embodiments, controller 302 is positioned locally (e.g., physically attached, physically positioned, secured, etc.) at display case 100 while remote controller 304 is positioned a distance away from display case 100 (e.g., in a cloud computing system, a remote location, a control station in a building where display case 100 is positioned, etc.). Controller 302 can obtain diagnostic data, alarm data, event data, etc., from one or more sensors, systems, electrical components, apparatuses, devices, etc., of display case 100 and can provide any of the diagnostic data, alarm data, event data, etc., to remote controller 304. In some embodiments, controller 302 is configured to perform any of the functionality of remote controller 304 so that any of the techniques, diagnostic techniques, etc., that are performed by remote controller 304 can be performed locally at display case 100 (e.g., by controller 302). Controller 302 and/or remote controller 304 can be configured to generate reports, diagnostic codes, etc., and may provide the reports or diagnostic codes to an operator or technician or owner (e.g., by operating a display device, a display screen, a notification device, an alarm/alert system, etc.).

Figure 3:
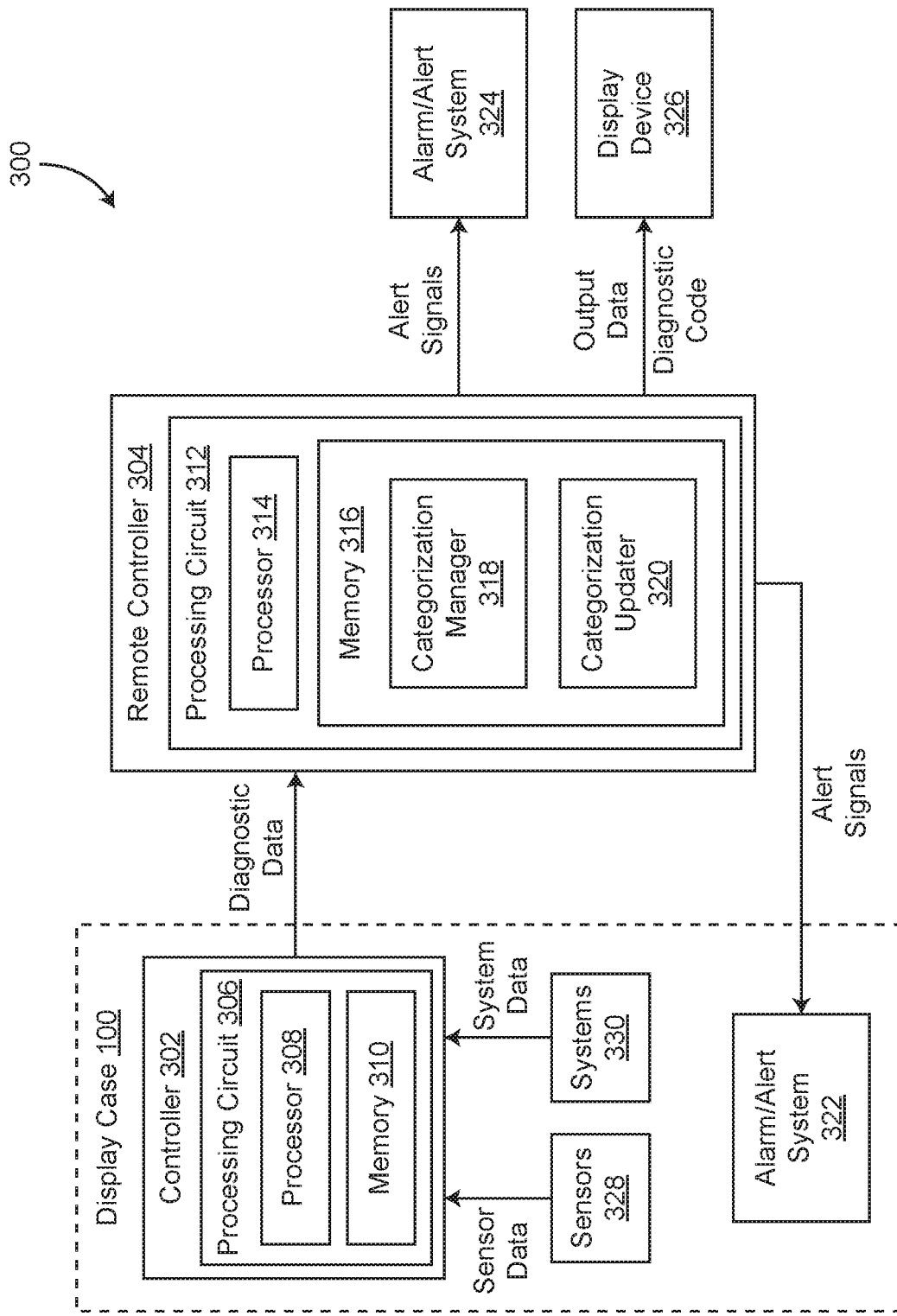
FIG. 3 is a block diagram of a control system for performing diagnostics for one or more display cases, according to some embodiments.

Referring particularly to FIG. 3, diagnostic system 300 is shown in greater detail. Controller 302 is positioned locally at display case 100 (e.g., physically attached to a sidewall of display case 100) and is configured to obtain or output diagnostic data from sensors 328 (e.g., temperature sensor 132) and/or system 330 (e.g., refrigeration apparatus 200) of display case 100. Controller 302 can be configured to perform local control for refrigeration apparatus 200, lighting devices, door opening actuators, electric motors, generators, etc., of display case 100. Controller 302 is configured to provide diagnostic data (e.g., any of the sensor data obtained from sensors 328, or any system data obtained form systems 330) to remote controller 304. Diagnostic data may include operational data such as actuator position, sensor data such as a current temperature within inner volume 110 of display case 100, etc. Diagnostic data can also include data regarding various electronic systems, electronic control systems, electronic modules, etc.

Referring still to FIG. 3, display case 100 can include an alarm/alert system 322 that is configured to operate to provide a warning, an alert, a notification, an alarm, etc., to a user, an owner, a technician, etc., of display case 100. In some embodiments, alarm/alert system 322 includes one or more visual alert devices (e.g., screens, touchscreens, displays, lights, strobe lights, etc.) and/or one or more aural alert devices (e.g., hooter alarms, sound producing devices, speakers, etc.) to provide an alert or an alarm. In some embodiments, alarm/alert system 322 is configured to provide a visual and/or an aural alarm or alert in response to receiving alert signals or a diagnostic code from remote controller 304.

Controller 302 includes a processing circuit 306, a processor 308, and memory 310. Processing circuit 306 can be communicably connected to a communications interface such that processing circuit 306 and the various components thereof can send and receive data via the communications interface. Processor 308 can be implemented as a general purpose processor, an application specific integrated circuit (ASIC), one or more field programmable gate arrays (FPGAs), a group of processing components, or other suitable electronic processing components.

Memory 310 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 310 can be or include volatile memory or non-volatile memory. Memory 310 can include database components, object code components, script components, or any other type of information structure for supporting the various activities and information structures described in the present application. According to some embodiments, memory 310 is communicably connected to processor 308 via processing circuit 306 and includes computer code for executing (e.g., by processing circuit 306 and/or processor 308) one or more processes described herein.

Referring still to FIG. 3, remote controller 304 includes a processing circuit 312, a processor 314, and memory 316. Processing circuit 312 can be communicably connected to a communications interface such that processing circuit 312 and the various components thereof can send and receive data via the communications interface. Processor 314 can be implemented as a general purpose processor, an application specific integrated circuit (ASIC), one or more field programmable gate arrays (FPGAs), a group of processing components, or other suitable electronic processing components.

Memory 316 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 316 can be or include volatile memory or non-volatile memory. Memory 316 can include database components, object code components, script components, or any other type of information structure for supporting the various activities and information structures described in the present application. According to some embodiments, memory 316 is communicably connected to processor 314 via processing circuit 312 and includes computer code for executing (e.g., by processing circuit 312 and/or processor 314) one or more processes described herein.

Remote controller 304 is configured to receive the diagnostic data from controller 302 and use the diagnostic data to generate a diagnostic code or output data and alert signals. Remote controller 304 can provide the output data or the diagnostic code to display device 326. Display device 326 can be a user device, a mobile device, a computer, a computer system, a display screen, etc., that is configured to receive the output data and/or the diagnostic data from remote controller 304 and provide the diagnostic code or the output data (e.g., visually) to a user, a technician, an owner, etc., of display case 100. In some embodiments, remote controller 304 is configured to obtain diagnostic data from more the one controller 302 or more than one display case 100. For example, multiple display cases 100 can be associated with a single controller 302 that is communicably coupled (e.g., wirelessly through a wireless radio or a wireless transceiver) with remote controller 304 so that remote controller 304 can obtain diagnostic data of multiple display cases 100. In some embodiments, multiple controllers 302 are configured to provide remote controller 304 with diagnostic data. For example, remote controller 304 can be communicably coupled (e.g., wirelessly or through a wireless data transmission system) with multiple controller 302, each of which are associated with a single display case 100 or multiple display cases 100. In some embodiments, controller 302 is a site controller (e.g., a central controller in a building) that is communicably coupled with local controllers at each display case 100 or at a rack of multiple display cases 100 and is configured to wirelessly communicate with remote controller 304 to provide diagnostic data regarding all display cases 100 in a building to remote controller 304.

In a typical rack of multiple display cases 100, there are a plethora of alarms or areas in which a display case 100 (or system, sub-system, component, sensor, etc., thereof) may fault or generate an alarm event. It can be difficult for a technician or a store owner to troubleshoot such alarms and discern which alarms or alerts require response (e.g., repair). At times, critical alarms or faults may go unnoticed while other alarms, which present only a warning may appear critical and be attended to by the technician. Advantageously, diagnostics system 300 as described herein can be configured to indicate a nature and criticality of a detected alarm event or fault detection so that a technician or an owner can make an informed decision regarding which alarms or faults require attention or repair. In some embodiments, diagnostics system 300 is also configured to indicate a nature and a warning level indication along with appropriate visual indications to alert an operator regarding a critical alarm.

Advantageously, remote controller 304 can be configured to classify or categorize alarms or faults as provided by the diagnostic data into a critical alarm category, an error category, a warning category, and an information only alarm category. Remote controller 304 can also be configured to promote an alarm or a fault that is received in the diagnostic data from controller 302 to a higher priority or to a different category. In some embodiments, promotion of alarms or faults to a different category or a different class is an optional feature of remote controller 304, the functionality of which, may be enabled based on a user input (e.g., at remote controller 304 or through display device 326). Advantageously, diagnostics system 300 as described herein facilitates allowing store managers to efficiently manage and assess a performance of various racks of display cases 100 in the building and to categorize and attend to alarms/events on a priority and need basis.

Memory 316 of remote controller 304 is shown to include a categorization manager 318 and a categorization updater 320. Categorization manager 318 is configured to categorize or classify alarms/events obtained from controller 302 (e.g., into one of several categories or classes). For example, categorization manager 318 can be configured to initially categorize alarms/events obtained from controller 302 into a critical alarm/event category, an error alarm/event category, a warning alarm/event category, and an information only alarm/event category.

Referring still to FIG. 3, categorization updater 320 can be configured to change an alarm/event from one of the several categories to another of the several categories. In some embodiments, categorization updater 320 may monitor an amount of time for which a particular alarm/event has been in a certain category (e.g., the error alarm/event category) and change the particular alarm/event to a different category (e.g., to the warning alarm/event category) based on the amount of time exceeding a threshold amount of time.

Referring particularly to FIG. 3, categorization manager 318 can be configured to use a weighted or ranked based classification code for alarms/events in the diagnostic data that are obtained from display case 100 (e.g., from controller 302). Categorization manager 318 can be configured to categorize each alarm/event based on a weight. In some embodiments, categorization manager 318 is configured to assign a weight to each alarm/event based on a mapping and a system, subsystem, device, sensor, etc., from which the alarm/event originates. In some embodiments, categorization manager 318 is configured to assign a priority and a rank to each alarm/event or alarm code that is obtained from the diagnostic data of display case 100.

In some embodiments, alarms/events under a specific category or multiple specific categories are associated with an action or an event to indicate the occurrence of an event/alarm of the specific category. For example, if categorization manager 318 identifies that an alarm/event has occurred under a certain category, remote controller 304 can operate alarm/alert system 324 or alarm/alert system 322 to notify a technician regarding the alarm/event. In some embodiments, if categorization manager 318 identifies that an alarm/event has occurred under a different category, remote controller 304 can operate display device 326 to notify the technician that such an alarm/event has occurred.

In some embodiments, categorization updater 320 is configured to promote alarms/events to a higher rank if the alarms/events persist for a predetermined amount of time or for a timeout interval. For example, categorization manager 318 may assign an initial rank $r_1$ to an alarm/event, and categorization updater 320 can monitor an amount of elapsed time $\Delta t_{elapsed}$ that the alarm/update has persisted. If the amount of elapsed time $\Delta t_{elapsed}$ exceeds or is equal to a timeout interval $\Delta t_{timeout,1}$, categorization updater 320 may promote the rank assigned to the alarm/event to a second rank $r_2$ (e.g., a rank that is higher than the first rank $r_1$). Categorization updater 320 may monitor an amount of elapsed time $\Delta t_{elapsed}$ that the alarm/event persists while it is assigned the second rank $r_2$. If the amount of elapsed time $\Delta t_{elapsed}$ that the alarm/event persists in the second rank $r_2$ exceeds a timeout interval $\Delta t_{timeout,2}$, categorization updater 320 may increase or promote the alarm/event to a third rank $r_3$ (e.g., a rank that is higher than the second rank $r_2$). Categorization updater 320 may continue to monitor the amount of elapsed time that the alarm/event persists and can continue promoting the rank of the alarm/event until the alarm/event is addressed by a technician. The timeout intervals may be uniform (e.g., all equal so that categorization updater 320 promotes the rank of the alarm/event incrementally based on the alarm/event persisting for an amount of time) or may be non-equal such. For example, the timeout interval $\Delta t_{timeout,1}$ may be equal to the timeout interval $\Delta t_{timeout,2}$, greater than the timeout interval $\Delta t_{timeout,2}$, or less than the timeout interval $\Delta t_{timeout,2}$.

Each rank can trigger an internal or an external indicator. For example, categorization manager 318 and/or categorization updater 320 can be configured to operate display device 326 (e.g., through a relay) based on what rank the alarm/event is currently assigned. Operating display device 326 can include activating different light emitting devices (e.g., external indicators), providing different messages, notifications, etc., based on the rank that is currently assigned to the alarm/event. In some embodiments, remote controller 304 and/or controller 302 are configured to operate alarm/alert system 324 or alarm/alert system 322 based on the rank that is currently assigned to the alarm/event. For example, remote controller 304 may operate alarm/alert system 324 or alarm/alert system 322 differently based on which of the ranks is currently assigned to the alarm/event. Certain ranks may be associated with different operations of alarm/alert system 322 or alarm/alert system 324. For example, lower ranks may include only providing a visual notification, while higher ranks (e.g., a critical rank) may be associated with operating a strobe light and/or a hooter alarm of alarm/alert system 322 or alarm/alert system 324.

In some embodiments, one or more of the ranks are a critical rank. For example, a highest rank may be a critical rank. If the alarm/event is initially assigned the critical rank (by categorization manager 318), remote controller 304 and/or controller 302 may be configured to activate or operate alarm/alert system 322 or alarm/alert system 324 to indicate a critical alarm that needs immediate attention (e.g., by activating a strobe light and/or a hooter alarm of alarm/alert system 322 or alarm/alert system 324). If the alarm/event is initially assigned a non-critical rank (e.g., a lower rank), but later becomes promoted to the critical rank (e.g., by categorization updater 320), remote controller 304 and/or controller 302 may operate alarm/alert system 324 or alarm/alert system 322 to provide the critical alarm. In some embodiments, only certain alarms/events that are initially assigned a predetermined rank or higher are able to be promoted to the critical rank. For example, if an alarm/event is assigned the lowest rank initially (e.g., by categorization manager 318), the alarm/event may be promoted to higher ranks, but not to the critical rank.

In some embodiments, any settings used by categorization manager 318 and/or categorization updater 320 are stored in memory 316 of remote controller 304. The settings used by categorization manager 318 and/or categorization updater 320 may be configurable by a user or an owner of diagnostic system 300 or display case 100. For example, the owner may change which alarms/events are initially assigned certain ranks, the amount of time that must pass before the alarms/events are promoted to a higher rank, etc.

Figure 4:
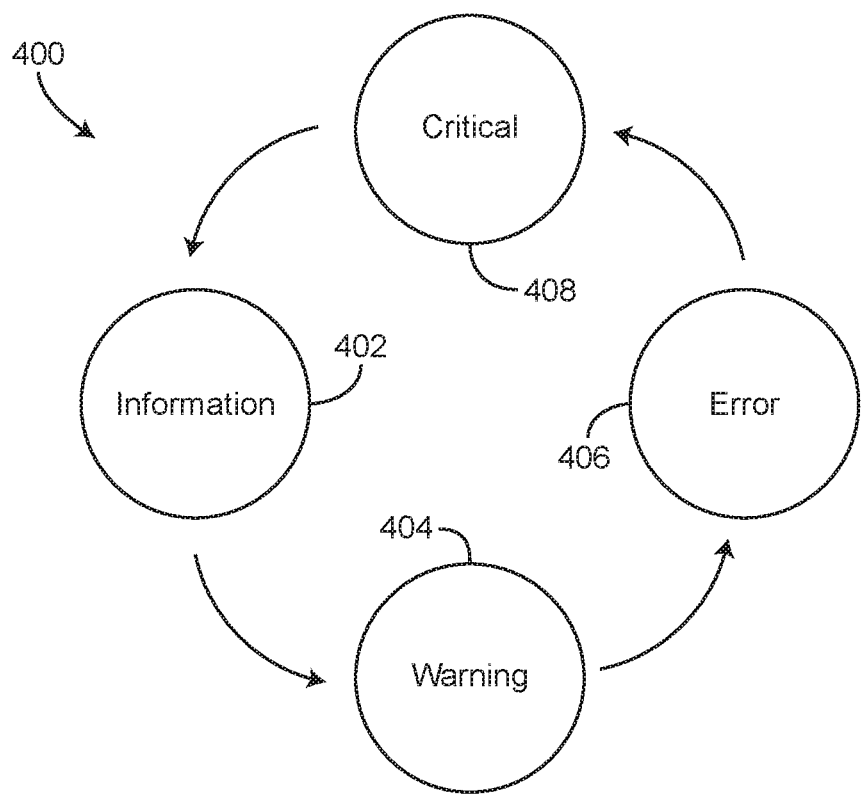
FIG. 4 is a state diagram of different classifications for an alarm or event of a display case, according to some embodiments.

Referring particularly to FIG. 4, a diagram 400 shows different ranks 402-408 that may be assigned to an alarm/event. Diagram 400 includes an information rank 402, a warning rank 404, an error rank 406, and a critical rank 408. In some embodiments, categorization manager 318 is configured to initially assign the alarm/event to one of ranks 402-408. For example, categorization manager 318 may initially assign an alarm/event to the information rank 402. Categorization updater 320 may use any of the techniques described in greater detail above to promote the alarm/event to any of warning rank 404, error rank 406, or critical rank 408. Remote controller 304 and controller 302 can operate alarm/alert system 324, alarm/alert system 322, or display device 326 based on the rank and/or category with which the alarm/alert is associated.

Referring again to FIG. 3, categorization manager 318 can be configured to use a binary tree classification to map a diagnostic code (e.g., a diagnostic troubleshooting code, a troubleshooting code, an alarm code, etc.) to a set of troubleshooting steps or an operation. In some embodiments, each alarm/event is associated with a diagnostic code. The diagnostic codes are received by remote controller 304 (e.g., by categorization manager 318) from controller 302 or display case 100. Advantageously, using a diagnostic tree classification reduces a number of troubleshooting steps that may need to be performed by a technician to a limited set of test methods, thereby allowing an operator or technician to reduce troubleshooting time.

In some embodiments, remote controller 304 is configured to assign each alarm/event obtained from controller 302 a first classification matrix and a second classification matrix. The two classification matrices can each include at least four categories of alarm classifiers that can be used to assign a classifier for each alarm/event type. In some embodiments, the first classification matrix is a category matrix and the second classification matrix is a promotional category matrix. In some embodiments, categorization manager 318 is configured to use the category matrix to initially assign a category or a rank to the alarm/event and categorization updater 320 is configured to use the promotional category matrix to promote the rank or category of the alarm/event.

The category matrix and the promotional category matrix may dictate or indicate a nature, impact, and criticality of the alarm/event or the operations performed in response to the alarm/event. For example, the first classifier matrix (i.e., the category matrix) may be a default classifier, while the second classifier matrix (i.e., the promotional category matrix) may be or indicate promotion ranks.

In some embodiments, the first classifier matrix (i.e., the category matrix) includes a critical rank, an error rank, a warning rank, and an information rank. The critical rank may indicate that the alarm/event is critical and requires attention. When an alarm/event is assigned the critical rank, remote controller 304 and/or controller 302 can operate alarm/alert system 324, alarm/alert system 322, or display device 326 to activate a strobe light and/or a hooter alarm to notify a technician, an owner, or a user that the alarm/event is critical and requires immediate attention. When an alarm/event is assigned the error rank, remote controller 304 and/or controller 302 can perform associated actions (e.g., operating display device 326 to display a warning message). When an alarm/event is assigned the error rank, remote controller 304 and/or controller 302 can perform different associated actions (e.g., operating display device 326 to provide a warning notification). When an alarm/event is assigned the information rank, remote controller 304 and/or controller 302 can perform other associated actions (e.g., operating display device 326 to provide information only regarding the alarm/event).

The second classifier matrix (i.e., the promotional category matrix) can also include the critical rank, the error rank, the warning rank, and the information rank. In some embodiments, the critical rank is the highest rank, indicating a critical category of the alarm/event.

In response to an alarm/event being assigned or promoted to the critical rank, remote controller 304 or controller 302 may trigger a critical alert by notifying a store owner or a store system through communications protocols (e.g., BACnet, MODBUS, etc.), activating a strobe light and/or a hooter alarm (as preferred by a store manager or set by a user), and/or providing email, SMS, or mobile device alerts (e.g., to an email server or a mobile device). Lower ranks (e.g., the alarm rank, the warning rank, the information rank, etc.) do not necessarily trigger the critical alerts since this may indicate that a severity of the alarm/event does not require immediate attention.

In some embodiments, categorization updater 320 is configured to monitor an amount of time that each alarm/event persists (e.g., persists at a particular rank). If the amount of time that each alarm/event persists at a particular rank exceeds a timeout interval, categorization updater 320 may promote the alarm/event to a promotion rank index or to a higher rank. In some embodiments, categorization updater 320 is configured to assign a value to each alarm/event from the promotion rank matrix based on a type of the alarm/event. An alarm/event may be promoted to a higher or lower category or rank from its original category or rank (as assigned by categorization manager 318) from the default category matrix (i.e., the first classification matrix). Advantageously, this allows store keepers, maintenance personnel, customers, etc., to organize an entire alarm/event database with rank based assignments to ensure that alarms and events which are critical are addressed based on their respective rank or category.

In some embodiments, remote controller 304 is configured to use a diagnostic tree to aid operators or technicians in troubleshooting a problem or error. In typical systems, an operator generally troubleshoots problems by viewing alarm details, checking a relevant manual for a help or alarm code, troubleshooting a respective alarm, and ignoring alarms that are non-critical. Advantageously, the systems and methods described herein provide a diagnostics system that can classify, rank, and provide troubleshooting instructions for the technician automatically.

Figure 5:
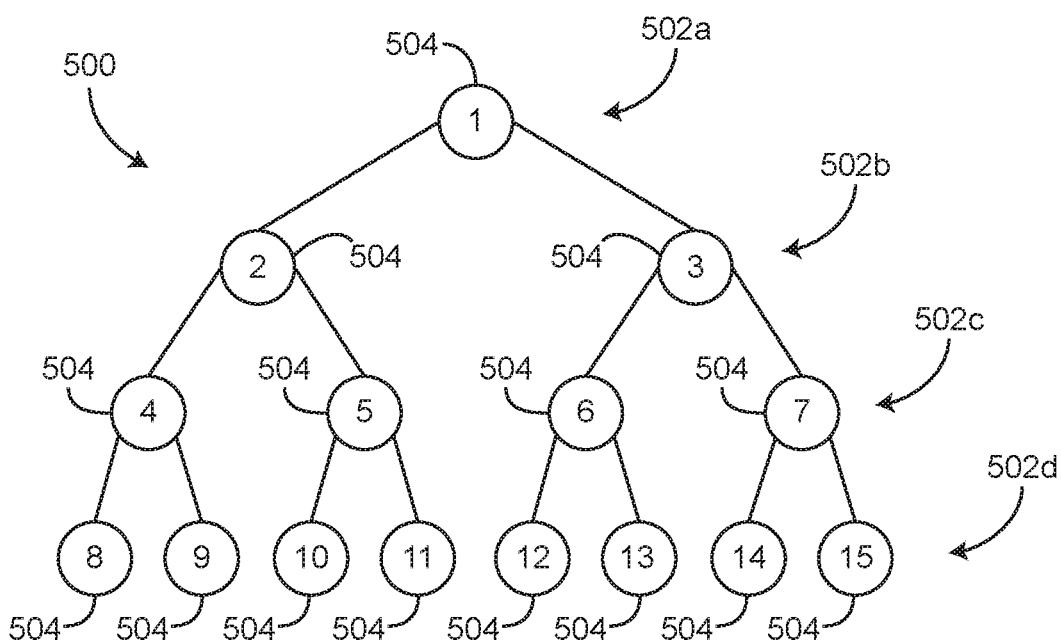
FIG. 5 is a diagram of an alarm/event classification tree, according to some embodiments.

Referring particularly to FIGS. 3 and 5, categorization manager 318 is configured to use a predefined binary tree 500 with nodes 504 that are basic classifiers, according to some embodiments. In some embodiments, categorization manager 318 uses binary tree 500 to map each diagnostic code to a corresponding set of troubleshooting steps that can be provided to a technician by operating display device 326. As shown in diagram 600 of FIG. 6, node 504a includes a first sub-node 504b and a second sub-node 504c. In some embodiments, the predefined binary tree 500 is spun or configured based on a primary classifier of the alarm/event category or rank. Various trees 500 can be used that are based on a logical classification or configuration of the display case 100 or refrigeration apparatus 200. In some embodiments, each node has only two sub-nodes. For example, the first node 504 may have the second node 504 and the third node 504 as sub-nodes.

In some embodiments, the predefined binary tree 500 includes four levels, shown as first level 502a, second level 502b, third level 502c, and fourth level 502d. The levels 502 may correspond to different portions or bytes of a code (e.g., a four-byte code) that is used by remote controller 304 (e.g., the diagnostic code obtained in the diagnostics data from controller 302). For example, the code may include a category, a system, a subsystem, and a class. In some embodiments, the category portion or byte of the code is a primary classification of a topology of display case 100 or refrigeration apparatus 200. The system portion or byte of the code may be a division/branch of a classifier to which the alarm/event belongs. The subsystem portion or byte of the code may be a sub-classification of a logical division/branch to which the alarm/event belongs. The class portion or byte of the code may be a class or a specific area to which the alarm/event belongs.

Referring particularly to FIG. 7, a diagnostics code 700 is shown that can be used by remote controller 304 to identify a corresponding action, alarm, operation, troubleshooting instructions, etc. Diagnostics code 700 can include category data 702, system data 704, subsystem data 706, and class data 708. In some embodiments, the data 702-708 are hexadecimal values that are used to retrieve the corresponding action, alarm, operation, troubleshooting instructions, etc., for the alarm/event. Remote controller 304 can obtain a diagnostic code 700 from display case 100 (or controller 302) and identify a location or node on the predefined binary tree 500 using the diagnostic code 700. In some embodiments, remote controller 304 (e.g., categorization manager 318) is configured to use the diagnostic code 700 to query and find an entry in a database. The entry in the database may indicate actions that should be performed, troubleshooting instructions to display on display device 326, etc. In some embodiments, remote controller 304 is configured to classify, sort, store, etc., any of the received diagnostics code 700 in memory 316 of remote controller 304. Any of the received diagnostics codes 700 may be retrieved and displayed by a technician (e.g., through operation of display device 326) so that the technician can view a sorted list of the diagnostic codes 700. For example, remote controller 304 can provide the display device 326 with any of the diagnostics codes 700, sorted by category, system, subsystem, class, etc., so that the technician can easily access and troubleshoot any alarms/events of the display case 100.

Advantageously, using such a classification (e.g., a four-byte classification as illustrated by diagnostics code 700 in FIG. 7) allows a large database of diagnostic data including alarms and events to be branched and classified into groups and subgroups. Each of the diagnostic codes 700 can be associated with a corresponding set of troubleshooting guides and steps to resolve the alarm/event. In some embodiments, the diagnostic code 700 has more than four bytes. Operators may lookup these four-byte diagnostic codes 700 (e.g., through display device 326 and/or by providing a user input to remote controller 304) to retrieve a corresponding troubleshooting guide or set of instructions to resolve the alarm/event (as retrieved from a database of memory 316).

Referring particularly to FIG. 8, table 800 illustrates various possible values of the category data 702 of diagnostics code 700. Table 800 includes a first column, shown as category column 802 and a second column, shown as hexadecimal column 804. Category column 802 includes an electronics control category, a refrigeration category, a communications networks category, a field inputs category, a rack inputs category, a field outputs category, a rack outputs category, a superheat control category, a pressure regulators category, a downstream category, and an upstream category. Each of these categories includes a corresponding hexadecimal value as shown in hexadecimal column 804.

Figure 11A:
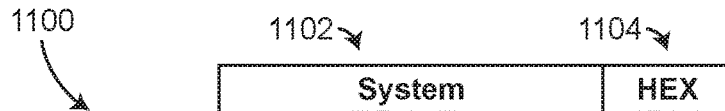

Referring particularly to FIGS. 11A-11B, table 1100 illustrates various possible values of the system data 704 of the diagnostics code 700. Table 1100 includes a first column shown as system column 1102 and a second column, shown as hexadecimal column 1104. System column 1102 includes various systems of the alarm/event (e.g., a controller system, multiple compressors, fans, etc.) from which the alarm/event may originate. Hexadecimal column 1104 includes a corresponding or associated hexadecimal value for each of the various systems.

Figure 10:
FIG. 10 is a table of various values of the subsystem of the troubleshooting code of FIG. 7, according to some embodiments.

Referring particularly to FIG. 10, table 1000 illustrates various possible values of the subsystem data 706 of the diagnostics code 700. Table 1000 includes a first column shown as subsystem column 1002 and a second column, shown as hexadecimal column 1004. Subsystem column 1002 includes various subsystems of the alarm/event (e.g., memory, configuration, protocols, probes, sensors, setpoints, etc.) from which the alarm/event may originate. Hexadecimal column 1004 includes a corresponding or associated hexadecimal value for each of the various subsystems.

Figure 9:
FIG. 9 is a table of various values of the class of the troubleshooting code of FIG. 7, according to some embodiments.

Referring particularly to FIG. 9, table 900 illustrates various possible values of the class data 708 of the diagnostics code 700. Table 900 includes a first column, shown as class column 902 and a second column, shown as hexadecimal column 904. Class column 902 includes various classes of the alarm/event (e.g., internal, communications, wiring, generator failure, calibration, program error, etc.) from which the alarm/event may originate. Hexadecimal column 904 includes a corresponding or associated hexadecimal value for each of the various classes.

Referring to FIGS. 7-11B, categorization manager 318 can be configured to sort, classify, list, aggregate, etc., the diagnostic codes based on the tables 800, 900, 1000, and 1100 using the category data 702, the system data 704, the subsystem data 706, and the class data 708 of each of the diagnostic codes 700. Categorization manager 318 may monitor metadata associated with the diagnostics code that indicates from where the alarm/event originates and use the metadata to identify the category data 702, the system data 704, the subsystem data 706, and the class data 708. In some embodiments, categorization manager 318 is configured to sort any of the diagnostic codes 700 in response to a user request (e.g., a request to sort the diagnostic codes 700 obtained in the diagnostic data according to category, system, subsystem, or class). Categorization manager 318 can be configured to provide the sorted diagnostic codes to display device 326 to display the sorted diagnostic codes.

Referring again to FIG. 3, categorization manager 318 can be configured to assign each diagnostic code 700 with a corresponding rank as described in greater detail above with reference to FIG. 3. Likewise, categorization updater 320 can update, promote, or otherwise change the rank based on an amount of time that the diagnostic code 700 persists with a corresponding rank. It should be understood that any of the functionality of categorization manager 318 and categorization updater 320 as described herein in regards to the information rank, the warning rank, the error rank, and the critical rank can be applied to each diagnostic code 700.

Figure 12:
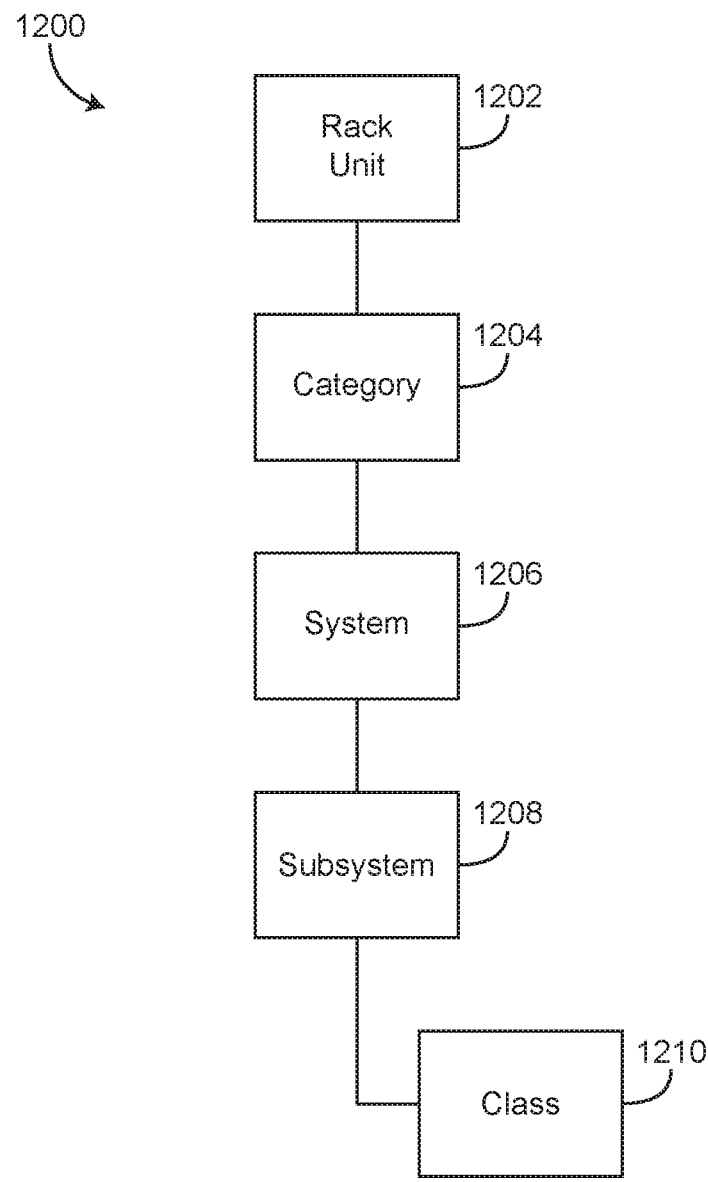
FIG. 12 is a block diagram of a diagnostic tree that can be used or generated by the control system of FIG. 3, according to some embodiments.

Referring particularly to FIG. 12, a data tree 1200 is shown, according to some embodiments. Data tree 1200 includes rack unit data 1202, category data 1204, system data 1206, subsystem data 1208, and class data 1210, according to some embodiments. Data tree 1200 can be the same as or similar to diagnostic code 700. For example, category data 1204 may be the same as category data 702, system data 1206 may be the same as system data 704, subsystem data 1208 may be the same as subsystem data 706, and class data 1210 may be the same as class data 708 as described in greater detail above with reference to FIG. 7. If remote controller 304 is communicably coupled with or configured to receive diagnostic codes 700 from multiple controllers 302 or associated with multiple display cases 100 or multiple racks of display cases 100, each diagnostic code 700 can also include rack data 1202 that indicates from which rack the diagnostic code 700 originates. Category data 1204 may be any of the hexadecimal values as shown in hexadecimal column 804 of table 800. System data 1206 may be any of the hexadecimal values as shown in hexadecimal column 1104 of FIGS. 11A-11B. Subsystem data 1208 may be any of the hexadecimal values as shown in hexadecimal column 1004 of table 1004. Class data 1210 may be any of the hexadecimal values as shown in hexadecimal column 904 of table 900.

Figure 13:
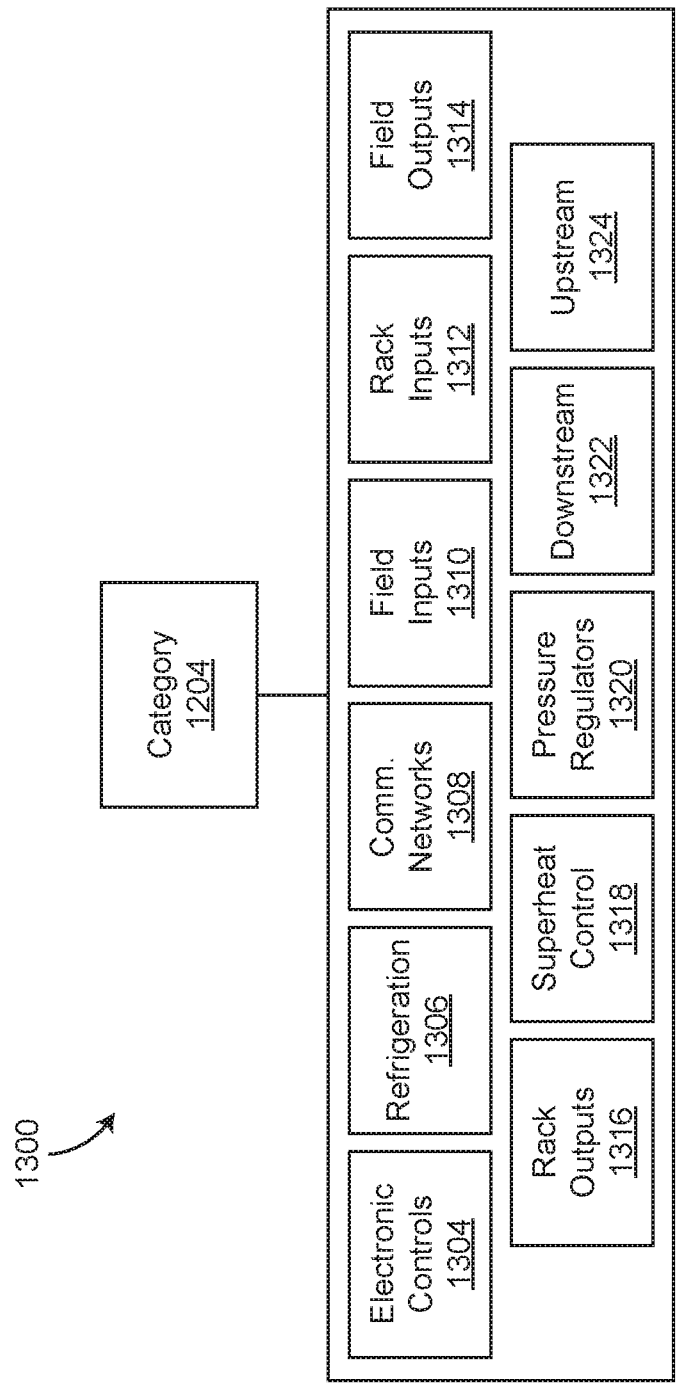
FIG. 13 is a block diagram of a diagnostic tree of the category of the troubleshooting code of FIG. 7, according to some embodiments.

Referring particularly to FIG. 13, a data tree 1300 illustrating category data 1204 in greater detail is shown, according to some embodiments. Category data 1204 can include electronic controls data 1304, refrigeration data 1306, communication networks data 1308, field inputs data 1310, rack inputs data 1312, field outputs data 1314, rack outputs data 1316, superheat control data 1318, pressure regulators data 1320, downstream data 1322, and upstream data 1324, or a hexadecimal value that indicates from which of these categories the alarm/event originates. In some embodiments, the data tree 1300 illustrated in FIG. 13 is a graphical representation of table 800 as shown in FIG. 8 above.

Figure 14:
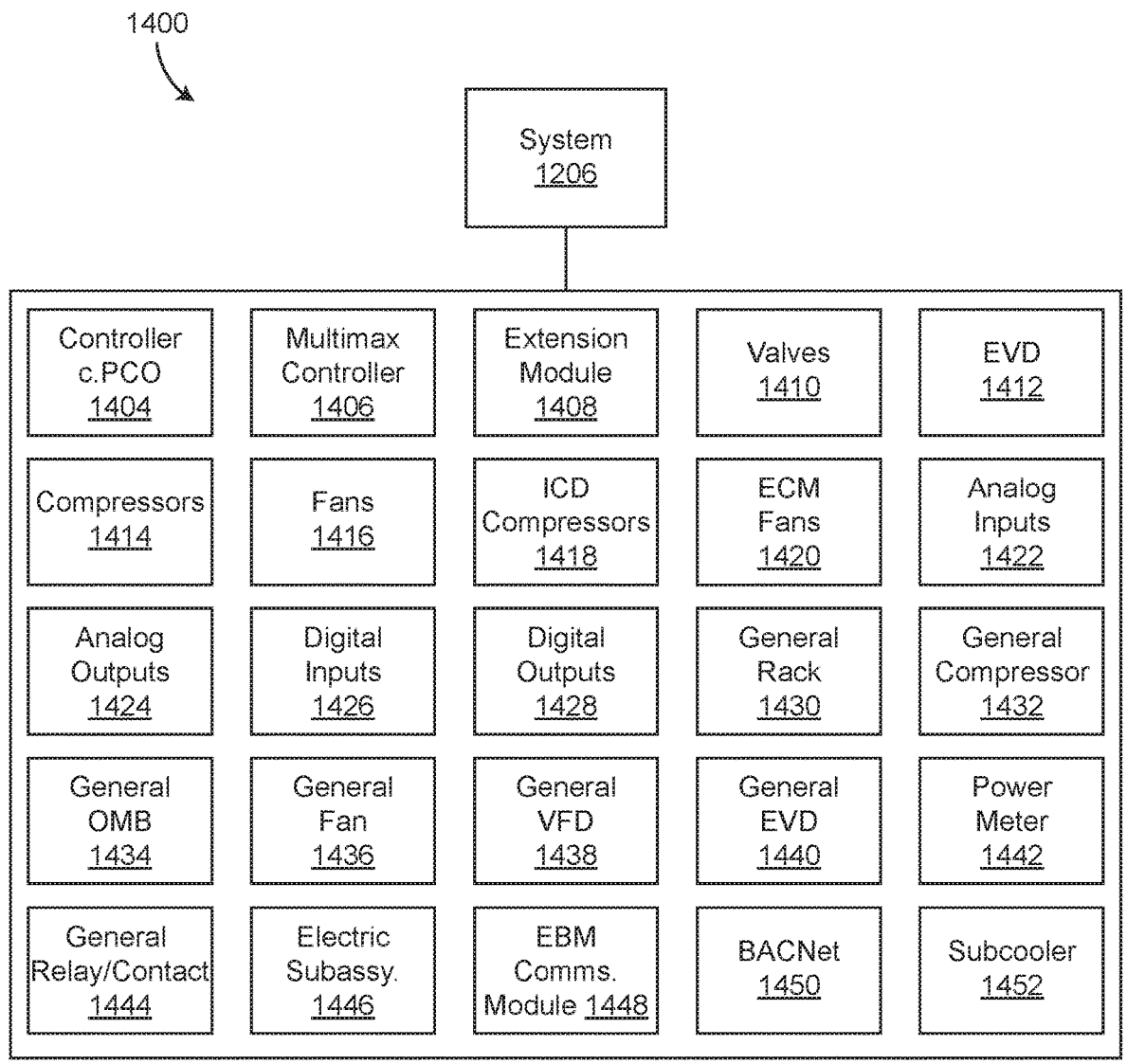
FIG. 14 is a block diagram of a diagnostic tree of the system of the troubleshooting code of FIG. 7, according to some embodiments.

Referring particularly to FIG. 14, a data tree 1400 illustrating system data 1206 in greater detail is shown, according to some embodiments. System data 1206 can include controller data 1404, multimax controller data 1406, extension module data 1408, valve data 1410, EVD controller data 1412, compressor data 1414, fan data 1416, ICD compressor data 1418, electronically commutated motor (ECM) fan data 1420, analog input data 1422, analog output data 1424, digital input data 1426, digital output data 1428, general rack data 1430, general compressor data 1432, general OMB data 1434, general fan data 1436, general variable frequency drive (VFD) data 1438, general EVD data 1440, power meter data 1442, general relay/contact data 1444, electric subassembly data 1446, EBM communications module data 1448, BACnet data 1450, and subcooler data 1452, or a hexadecimal values that indicates from which of these systems the alarm/event originates. In some embodiments, the data tree 1400 illustrated in FIG. 14 is a graphical representation of table 1100 shown in FIGS. 11A-11B above.

Figure 15:
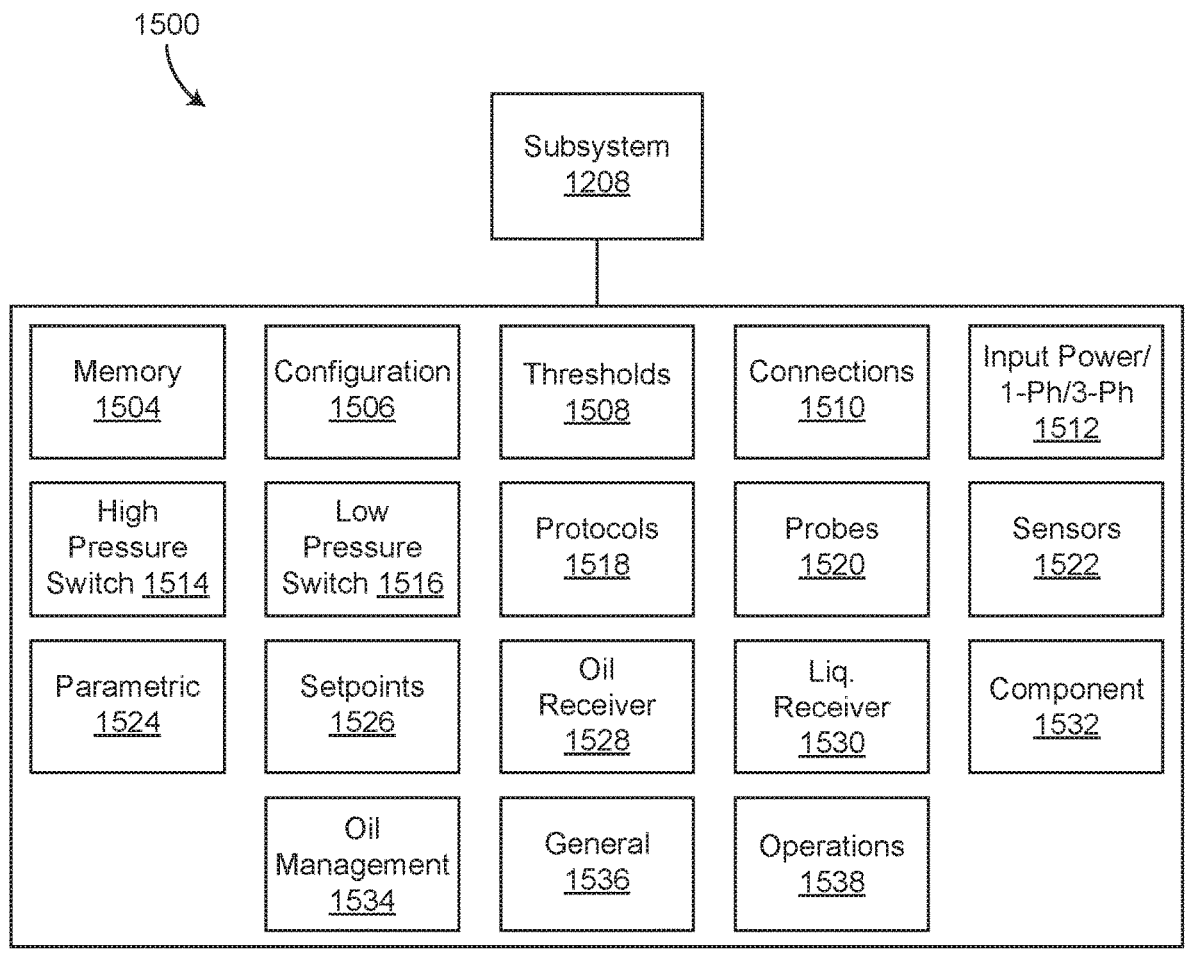
FIG. 15 is a block diagram of a diagnostic tree of the subsystem of the troubleshooting code of FIG. 7, according to some embodiments.

Referring particularly to FIG. 15, a data tree 1500 illustrating subsystem data 1208 in greater detail is shown, according to some embodiments. Subsystem data 1208 can include memory data 1504, configuration data 1506, threshold data 1508, connection data 1510, input power data 1512, high pressure switch data 1514, low pressure switch data 1516, protocol data 1518, probe data 1520, sensor data 1522, parametric data 1524, setpoint data 1526, oil receiver data 1528, liquid receiver data 1530, component data 1532, oil management data 1534, general data, and operation data 1538, or a hexadecimal value that indicates from which of these subsystems the alarm/event originates. In some embodiments, the data tree 1500 as illustrated in FIG. 15 is a graphical representation of table 1000 shown in FIG. 10 above.

Figure 16:
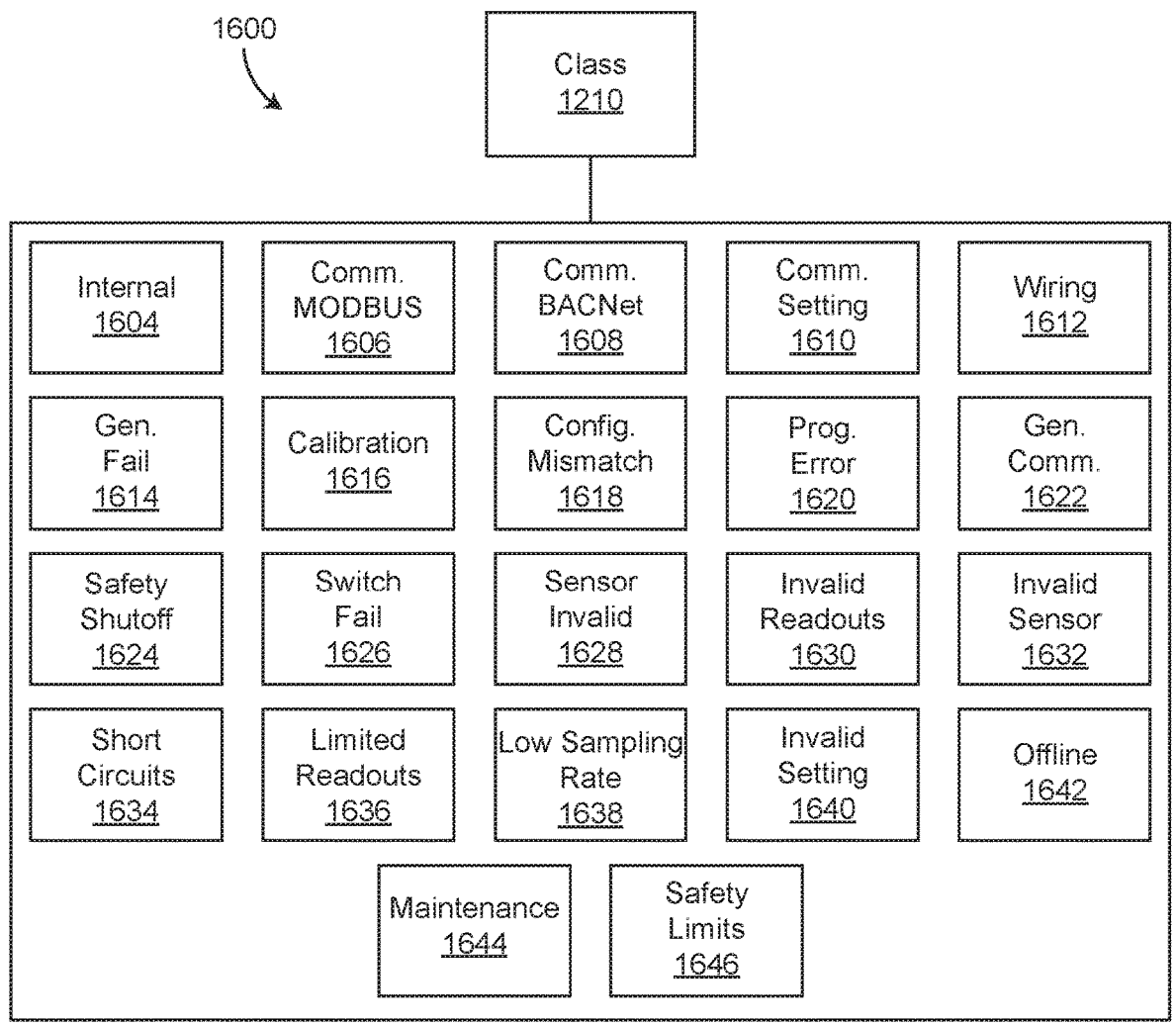
FIG. 16 is a block diagram of a diagnostic tree of the class of the troubleshooting code of FIG. 7, according to some embodiments.

Referring particularly to FIG. 16, a data tree 1600 illustrating class data 1210 in greater detail is shown, according to some embodiments. Class data 1210 can include internal data 1604, MODBUS communications data 1606, BACNet communications data 1608, communications settings data 1610, wiring data 1612, generator failure 1614, calibration data 1616, configuration mismatch data 1618, program error data 1620, generator communications data 1622, safety shutoff data 1624, switch failure data 1626, sensor invalid data 1628, invalid readouts data 1630, invalid sensor data 1632, short circuit data 1634, limited readouts data 1636, low sampling rate data 1638, invalid setting data 1640, offline data 1642, maintenance data 1644, and safety limits data 1646, or a hexadecimal value that indicates from which of these classes the alarm/event originates. In some embodiments, the data tree 1600 as illustrated in FIG. 16 is a graphical representation of table 900 shown in FIG. 9 above.

Figure 17:
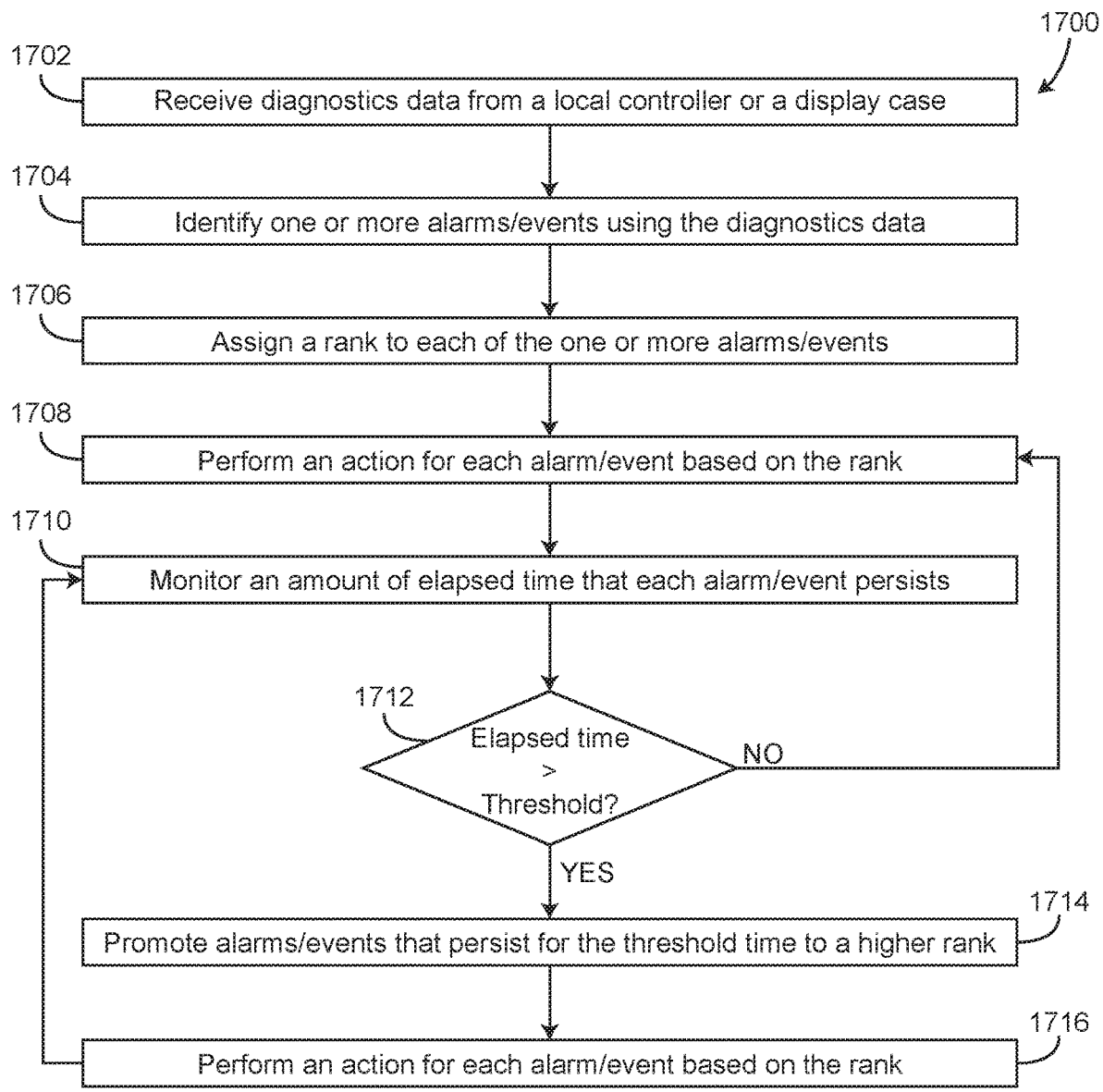
FIG. 17 is a flow diagram of a process for performing diagnostics for a display case, according to some embodiments.

Referring particularly to FIG. 17, a process 1700 for performing advanced diagnostics for a display case (e.g., a refrigerated display case, display case 100, etc.) is shown, according to some embodiments. Process 1700 includes steps 1702-1716 and may be performed by diagnostics system 300. Process 1700 can be performed by diagnostics system 300 to provide alarms, alerts, notifications, information, etc., to a technician or owner of the display case so that the technician or owner may be prompted to perform maintenance or address various errors, faults, etc., of the display case.

Process 1700 includes receiving diagnostics data from a local controller of a display case (step 1700), according to some embodiments. In some embodiments, the diagnostics data is data associated with an alarm or an event that indicates that the display case is not operating properly. For example, the diagnostics data can include codes (e.g., diagnostic codes, troubleshooting codes, etc.) that indicate the alarm or the event. In some embodiments, step 1702 is performed by remote controller 304. Remote controller 304 can obtain or receive the diagnostics data from a local controller (e.g., controller 302) that is configured to obtain sensor data, system data, alarm data, event data, etc., from various devices, components, systems, sub-systems, apparatuses (e.g., refrigeration apparatus 200), etc., of the display case.

Process 1700 includes identifying one or more alarms/events using the diagnostics data (step 1704), according to some embodiments. Step 1704 can include extracting, reading, or analyzing diagnostics codes or troubleshooting codes from the diagnostics data. Step 1704 can be performed by categorization manager 318.

Process 1700 includes assigning a rank to each of the one or more alarms/events that are identified in step 1704 (step 1706), according to some embodiments. Step 1706 can include assigning a rank of information-only, warning, error, or critical. In some embodiments, step 1706 is performed by categorization manager 318. Categorization manager 318 may assign the rank to each of the one or more alarms/events based on any of, or a combination of, a category information, system information, subsystem information, or class information from which the diagnostics data or the alarm/event originates, and a mapping or predetermined set of instructions stored in memory. For example, alarms/events that originate at a particular system (e.g., failure of refrigeration apparatus) of the display case may be initially assigned a higher rank (e.g., critical) than alarms/events that originate at a different system (e.g., a lighting system).

Process 1700 includes performing an action for each alarm/event based on the rank (step 1708), according to some embodiments. In some embodiments, step 1708 is performed by remote controller 304 and/or controller 302, which may generate control signals, alert signals, or output data for any of alarm/alert system 324, alarm/alert system 322, or display device 326. For example, for an alarm/event that is assigned an information rank, remote controller 304 may operate display device 326 to provide a notification regarding the alarm/event. The notification may include diagnostics data associated with the alarm/event. In another example, for an alarm/event that is assigned the warning rank, remote controller 304 may operate display device 326 and/or at least one of alarm/alert system 322 or alarm/alert system 324 to provide a warning to a technician. In yet another example, for an alarm/event that is assigned the error rank, remote controller 304 may operate display device 326, alarm/alert system 324, or alarm/alert system 322 to provide an error code, an error notification, a visual alert, etc., to an owner or technician. In yet another example, for an alarm/event that is assigned the critical rank, remote controller 304 may operate display device 326, alarm/alert system 324, or alarm/alert system 322 to provide a visual and/or aural alert to notify a technician or an owner that a critical alert or a critical event has occurred.

Process 1700 includes monitoring an amount of elapsed time that each alarm/event persists (step 1710), according to some embodiments. Step 1710 can be performed by categorization updater 320. Step 1710 can include recording a time at which the alarm/event first occurred and comparing the time at which the alarm/event first occurred to a current time to determine or calculate an amount of elapsed time over which each alarm/event has persisted.

Process 1700 includes determining if the elapsed time is greater than a threshold (step 1712), according to some embodiments. Step 1712 can be performed by categorization updater 320. In some embodiments, the threshold is a value that is stored in memory 316 of remote controller 304. In response to determining that the elapsed time is greater than the threshold (step 1712, "YES"), process 1700 proceeds to step 1714. In response to determining that the elapsed time is less than the threshold (step 1712, "NO"), process 1700 returns to step 1708. Categorization updater 320 may perform step 1712 for each of the alarms/events.

Process 1700 includes promoting the alarms/events that persist for the threshold time to a higher rank (step 1714), according to some embodiments. In some embodiments, step 1714 is performed by categorization updater 320. For example, if the alarm/event persists for the threshold amount of time (step 1712, "YES"), categorization updater 320 may promote or elevate the rank of the corresponding alarm/event (e.g., from the information rank to the warning rank, to the error rank, to the critical rank). Step 1714 can be performed by categorization updater 320 for each of the alarms/events that persist for the threshold amount of time.

Process 1700 includes performing an action for each alarm/event based on the rank (step 1716), according to some embodiments. Step 1716 can be performed by remote controller 304 and alarm/alert system 324, display device 326, and/or alarm/alert system 322. In some embodiments, step 1716 is similar or the same as step 1708. Step 1716 can include performing step 1708 but for the promoted ranks of the alarms/events.

Configuration of Exemplary Embodiments

The construction and arrangement of the temperature-controlled display device as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "first", "second", "primary," "secondary," "above," "below," "between," etc.) are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the FIGURES may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A diagnostics system for a display case, the diagnostics system comprising:
   the display case comprising a local controller, a refrigeration apparatus, and a plurality of sensors;
   a display device; and
   a remote controller comprising a processing circuit configured to:
      receive diagnostics data from the local controller of the display case, wherein the diagnostics data comprises troubleshooting codes associated with each of one or more events, the troubleshooting codes comprising at least one of a category of the event, a system of the event, a subsystem of the event, or a class of the event and the troubleshooting codes sorted based on the category, the system, the subsystem, or the class of the troubleshooting codes;
      assign a digital value indicating a rank to each of the one or more events, the rank indicating a severity of each of the one or more events relative to other events;
      store the digital value indicating the rank of each of the one or more events in association with a respective troubleshooting code of the event in memory of the remote controller;
      in response to determining a particular event has persisted for at least a threshold amount of time, change the digital value indicating the rank associated with the particular event to indicate a higher rank; and
      operate the display device to notify a user regarding the one or more events, based on a respective rank of each of the one or more events.

2. The diagnostics system of claim 1, wherein the processing circuit is configured to assign any of an information rank, a warning rank, an error rank, or a critical rank to each of the one or more events.

3. The diagnostics system of claim 2, further comprising an alert system, wherein the processing circuit is configured to operate the alert system to provide at least one of a visual or an aural alert to the user for any of the one or more events assigned the critical rank.

4. The diagnostics system of claim 1, wherein the processing circuit is configured to display the troubleshooting codes on the display device.

5. The diagnostics system of claim 1, wherein the processing circuit is configured to:
   map each of the troubleshooting codes to a troubleshooting strategy using a classification tree, the category, the system, the subsystem, and the class; and
   operate the display device to provide the troubleshooting strategy to the user.

6. The diagnostics system of claim 1, wherein the processing circuit is configured to notify an owner regarding one or more events assigned a critical rank by:
   sending an email to the owner;
   sending a text message to the owner;
   providing a notification to a mobile device; or
   operating the display device.

7. The diagnostics system of claim 1, wherein:
   the rank assigned to each of the one or more events based on the severity of each of the one or more events comprises:
   a first rank; and
   a second rank of each of the one or more events based on an amount of time that each of the one or more events persists, wherein the second rank is higher than the first rank.

8. The diagnostics system of claim 1, wherein:
   the rank assigned to each of the one or more events based on the severity of each of the one or more events comprises:
   a first rank; and
   a second rank of each of the one or more events based on an amount of time that each of the one or more events persists, wherein the second rank is lower than the first rank.

9. The diagnostics system of claim 1, wherein the threshold amount of time comprises a timeout interval, wherein the timeout intervals of each of one or more events are uniform.

10. The diagnostic system of claim 1, wherein determining the particular event has persisted for equal to or greater than the threshold amount of time comprises:
    comparing an amount of time that the event has persisted to the threshold amount of time; and
    in response to the amount of time being equal to or greater than the threshold amount of time, promoting the rank of the particular event to a higher rank.

11. The diagnostic system of claim 1, wherein each of one or more events comprises another event different than the particular event, determining the another event has persisted for equal to or greater than the threshold amount of time comprises:
    comparing an amount of time that the another event has persisted to the threshold amount of time; and
    in response to the amount of time being less than the threshold amount of time, maintaining the rank of the another event and maintaining the digital value indicating the rank associated with the another event.

12. A controller for a diagnostics system of a display case, the controller comprising a processing circuit configured to:
    receive diagnostics data from a local controller of the display case, wherein the diagnostics data comprises troubleshooting codes associated with each of one or more events, the troubleshooting codes comprising at least one of a category of the event, a system of the event, a subsystem of the event, or a class of the event and the troubleshooting codes sorted based on the category, the system, the subsystem, or the class of the troubleshooting codes;
    assign a digital value indicating a rank to each of the one or more events, the rank indicating a severity of each of the one or more events of each of the one or more events relative to other events;

store the digital value indicating the rank of each of the one or more events in association with a respective troubleshooting code of the event in memory of the controller;

in response to determining a particular event has persisted for at least a threshold amount of time, change the digital value indicating the rank associated with the particular event to indicate a higher rank; and operate a display device to notify a user regarding the one or more events based on a respective rank of each of the one or more events.

13. The controller of claim 12, wherein the processing circuit is configured to, for each of the one or more events:
compare an amount of time that the event has persisted to the threshold amount of time;
promote the rank of the event to a higher rank in response to the amount of time being equal to or greater than the threshold amount of time; and
maintain the rank of the event in response to the amount of time being less than the threshold amount of time.

14. The controller of claim 12, wherein the processing circuit is configured to assign any of an information rank, a warning rank, an error rank, or a critical rank to each of the one or more events.

15. The controller of claim 14, wherein the processing circuit is configured to operate an alert system to provide at least one of a visual or an aural alert to the user for any of the events assigned the critical rank.

16. The controller of claim 12, wherein the processing circuit is configured to display the troubleshooting codes based on the category, the system, the subsystem, or the class of the troubleshooting codes on the display device.

17. The controller of claim 12, wherein the processing circuit is configured to:
map each of the troubleshooting codes to a troubleshooting strategy using a classification tree, the category, the system, the subsystem, and the class; and
operate the display device to provide the troubleshooting strategy to the user.

18. A method for a diagnostics of a display case, the method comprising:
receiving diagnostics data from the display case, wherein the diagnostics data comprises troubleshooting codes associated with each of one or more events, the troubleshooting codes comprising at least one of a category of the event, a system of the event, a subsystem of the event, or a class of the event and the troubleshooting codes sorted based on the category, the system, the subsystem, or the class of the troubleshooting codes;
assigning a digital value indicating a rank to each of the one or more events, the rank indicating a severity of each of the one or more events of each of the one or more events relative to other events;
storing the digital value indicating the rank of each of the one or more events in association with a respective troubleshooting code of the event;
in response to determining a particular event has persisted for at least a threshold amount of time, changing the digital value indicating the rank associated with the particular event to indicate a higher rank; and
operating a display device to notify a user regarding the one or more events based on a respective rank of each of the one or more events.

19. The method of claim 18, further comprising, for each of the one or more events:
comparing an amount of time that the event has persisted to a threshold amount of time;
promoting the rank of the event to a higher rank in response to the amount of time being equal to or greater than the threshold amount of time; and
maintaining the rank of the event in response to the amount of time being less than the threshold amount of time.

20. The method of claim 18, further comprising assigning any of an information rank, a warning rank, an error rank, or a critical rank to each of the one or more events.

21. The method of claim 20, further comprising operating an alert system to provide at least one of a visual or an aural alert to the user for any of the one or more events assigned the critical rank.

22. The method of claim 20, wherein the diagnostics data comprises:
mapping each of the troubleshooting codes to a troubleshooting strategy using a classification tree, the category, the system, the subsystem, and the class; and
operating the display device to provide the troubleshooting strategy to the user.

* * * * *